2,864,871
Patented Dec. 16, 1958

2,864,871

METHOD OF PRODUCING DINITRO-TETRA ALKYL BENZENES

Marion G. Morningstar, Cuyahoga Falls, Ohio, assignor to The B. F. Goodrich Company, New York, N. Y., a corporation of New York No Drawing. Application July 20, 1956
Serial No. 599,017

4 Claims. (Cl. 260—645)

This invention relates to a method of producing 1,4-dinitro-2,3,5,6-tetra alkyl benzenes and more particularly to a method of commercially producing 1,4-dinitro-2,3,5,6-tetra alkyl benzenes in high yields and at low costs.

It has heretofore been proposed to prepare a 1,4-dinitro-2,3,5,6-tetra alkyl benzene by conventional nitration in mixed acids, such as mixed sulfuric and nitric acids, generally in the presence of solvents, but these prior methods result in low yields and in complex mixtures from which is it necessary to separate out the dinitro-tetra alkyl benzene, in itself a difficult and expensive commercial operation.

An object of this invention is to produce a 1,4-dinitro-2,3,5,6-tetra-alkyl benzene directly from nitric acid and a 2,3,5,6-tetra alkyl benzene, without the production of any substantial amount of other products and hence to produce a 1,4-dinitro-2,3,5,6-tetra alkyl benzene of high quality and in yields approaching the theoretical.

I have found that the 1,4-dinitro-2,3,5,6-tetra alkyl benzenes may be commercially made by the direct reaction of a 2,3,5,6-tetra alkyl benzene, preferably in finely divided powder form, sometimes hereinafter referred to as the "powdered reactant," and strong nitric acid of a specific gravity of from 1.41 to 1.51, that is, from a 75% to 99+% nitric acid, provided the reaction conditions are properly maintained throughout the period of the reaction so as to avoid the formation of nitrogen dioxide fumes being given off by the acid during the reaction, thus

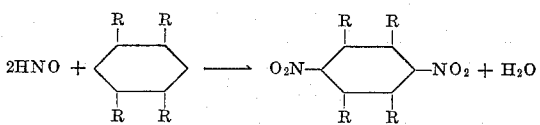

wherein R is an initially straight chained alkyl radical, that is, the carbon atom of the alkyl radical attached to a carbon atom of the benzene ring has only one other carbon atom attached thereto.

Extensive experimentation has demonstrated that strong nitric acids are necessary in carrying out the invention of this application and that fuming nitric acids are incapable of producing the results attained in this invention, since the nitrogen dioxide fumes given off are very strong oxidizing agents and facilitate side reactions, thus producing unwanted by-products and making it difficult to isolate the pure 1,4-dinitro-2,3,5,6-tetra alkyl benzenes from the reaction mixture. Further, fuming nitric acid is relatively expensive, its cost being about twice that of the strong nitric acids utilized in carrying out the process of this invention. Hence, fuming nitric acid, even if it could be used in the invention of this application, which it cannot, would be uneconomical both from the standpoint of costs of the reactants and of the costs of isolating the end product from the final reaction mixture.

I have discovered to be most satisfactory for the operations of the invention of this application a strong nitric acid of a specific gravity ranging from 1.49 to 1.512, or from about a 95% to a 99+% nitric acid, although satisfactory results have been attained with strong nitric acid of a specific gravity having a wider range, from 1.41 to 1.512 or from a 75% to a 100—% nitric acid. The exact strength of the nitric acid depends on conditions of the nitrating reaction, which should be such that no nitrogen dioxide fumes, recognized by their characteristic brownish yellow color and pungent odor, are formed during the reaction. To arrive at this result, three factors need be considered, the rate of cooling of the reaction mixture, the degree of agitation of the reaction mixture and the rate of addition of the powdered 2,3,5,6-tetra alkyl benzene to the reaction mixture. Fundamentally, the degree of agitation and the rate of addition of the powdered reactant and the rate of cooling should be co-ordinated so that the reaction may be satisfactorily carried out with the reaction mixture at temperatures at which nitrogen dioxide fumes will not be formed in the course of the reaction. In such cases, the agitation of the nitric acid should be vigorous, the cooling should be effective to carry away the heat of the exothermic reaction as it is generated in the reaction mixture and the addition of the powdered reactant gradually, little-by-little, and preferably although not necessarily wide-spread over the surface of the nitric acid, as by shifting the powder slowly over the surface of the nitric acid, and at a rate such as to avoid any local "hot spots" developing in the reaction mixture that would give rise to the formation of the nitrogen dioxide fumes.

In actual commercial operations, it has been demonstrated to be desirable to maintain the nitric acid and the reaction mixture made by adding the powdered reactant to the nitric acid at a relatively low temperature, in order to provide an adequate factor of safety, say, 15° to 25° C., or lower, and preliminarily to cool the nitric acid from 5° to 15° C., although it is to be understood that the initial temperature of nitric acid may be somewhat higher if that temperature is maintained throughout the reaction. Applicant has discovered in his investigations that the stronger the nitric acid, the higher the yield of the 1,4,-dinitro-2,3,5,6-tetra alkyl benzene, provided the formation of deleterious nitrogen dioxide fumes are avoided, and for that reason, in commercial operations as strong a nitric acid as can be used satisfactorily in the equipment employed is selected.

Currently, there is a considerable demand for the 1,4-dinitro-2,3,5,6-tetra alkyl benzenes of this application, particularly as intermediates for the production by reduction of 1,4,-diamino-2,3,5,6-tetra alkyl benzenes.

In commercial production, the reaction has been successfully carried out in a stainless steel cylindrical reactor, open at the top, and set in a container of ice water, or in a more effective cooling jacket, as one through which refrigerated alcohol is circulated. It may also be desirable to suspend a cooling coil, such as a stainless steel coil, in the reactor. Preferably the convolutions of the coil are spread from each other and from the cylindrical walls of the reactor so as to permit the reaction mixture to flow freely through and around the coils under the influence of an agitator. As to the latter a centrally disposed stainless steel propeller blade agitator, spaced somewhat from the bottom of the reactor, has been satisfactory. In winter, tap water circulated through the coils has proven to be satisfactory, but refrigerated alcohol circulated through the coils is preferable for maintenance of uniform performance the year round. A sifter for feeding the powdered reactant gradually to, and spreading it over, the surface of the nitric acid within the reactor is normally employed, as well as a thermometer for indicating the temperature of the reaction mixture.

Alternatively, a glass reactor, glass cooling coils and a glass agitator may be employed and have proven to be useful in small pilot operations.

As illustrative of the process of this application, the following examples are given.

Example I

A 400 milliliter cylindrical reactor, with an open top, is set in an ice bath and is equipped with an effective stirrer and a thermometer. Into the reactor is placed 100 milliliters of strong nitric acid (sp. gr. 1.51), approximately 100% nitric acid, which is stirred until the temperature of the nitric acid drops to about 10° C. While continuing the stirring and the cooling, a finely divided powdered reactant, namely, 2,3,5,6-tetra methyl benzene, is slowly sifted onto the surface of the nitric acid, which being in circulatory agitating movement, readily takes up and disperses the powdered reactant through the nitric acid. At first the reaction is very fast and the temperature rises but is controlled to from 13° to 16° C. by the rate of feeding the powdered reactant.

Parenthetically, it is here stated that, with the above reactant charge in the above equipment, it has been found that where the temperature initially rises to above 17° C., nitrogen dioxide fumes may be generated, although this is not always the case, which fumes cause unwanted oxidation products to be formed in the reaction mixture. Tests indicate that such fumes are occasioned by careless operation, that is, lack of coordination of these factors, the rate of addition and spread of the powdered reactant to the surface of the reactor contents, and the continuity and effectiveness of the cooling.

Near the end of the addition of the powdered reactant (21.1 grams of 2,3,5,6-tetra methyl benzene in all are added), the reaction rate slows down and the temperature is maintained somewhat higher, preferably under 20° C. until the reaction is completed.

It is here noted that as soon as the powdered reactant is added to the nitric acid, a very dark compound is formed which gradually disappears with stirring, leaving a clear yellow solution. As the powdered reactant is continued to be added, the reactant becomes slower and crystals of 1,4-dinitro-2,3,5,6-tetra methyl benzene form in the reaction mixture. The addition of the powdered reactant continues until 21.1 grams (the theoretical amount) of the 2,3,5,6-tetra methyl benzene have been added, stirred in and the reaction completed.

The reactor contents are then poured into a 300 milliliters of ice water with vigorous stirring. A white milky precipitate immediately forms. The solids are filtered out of the ice water mixture, washed with water, reslurried in a 10% solution of sodium carbonate, washed in cold water and filtered as dry as possible. The filtered solids are then thoroughly dried, as in a vacuum desiccator. Analysis shows the resulting crystalline product yield to be 34.5 grams of 1,4-dinitro-2,3,5,6-tetra methyl benzene, or a yield of 98.0% of the theoretical yield.

Example II

Into a stainless steel cylindrical open top reactor setting in an ice bath and having two banks of cooling coils inside the reactor through which cold alcohol is circulated, are placed 4613 grams of 95% nitric acid (sp. gr. 1.49), which is vigorously stirred and cooled to around 7° to 10° C. Then 481 grams of finely divided 2,3,5,6-tetra methyl benzene (the powdered reactant) are slowly sifted onto the surface of the nitric acid, with continuous stirring and cooling of the reactor contents, the addition being at a rate that keeps the reactor contents less than 20° C. When all of the powdered reactant has been added, stirred in and the reaction completed, following the procedure of Example I, the reactor contents are mixed into water having a temperature of about 0° C., the water mixture becoming somewhat warmed from the heat of dilution, and the precipitate treated as in Example I. Analysis shows the yield to be 759 grams of 1,4-dinitro-2,3,5,6-tetra methyl benzene, or a yield of 94.5%.

A comparison of the yields in Examples I and II indicates that the stronger the nitric acid the higher the yield of the 1,4-dinitro-2,3,5,6-tetra methyl benzene, and this has been confirmed by repeated tests.

Example III

Utilizing the same equipment as in Example II, 5478 grams of 75% nitric acid (sp. gr. 1.43) are placed in the steel reactor, vigorously stirred and cooled to about 15° C. Then, 516 grams of a finely divided 2,3,5-trimethyl-6-ethyl benzene (the powdered reactant) are slowly added to, as by sifting onto the surface of, the reactor contents, with continuous stirring and cooling of the reactor contents, and at a rate of addition and cooling that keeps the reactor contents at a temperature not in excess of 25° C. (Repeated tests demonstrate that, with the less strong nitric acid, vigorous stirring and slow addition of the powdered reactant, no nitrogen dioxide fumes will be liberated at temperatures less than 25° C.). When all the powdered reactant has been added, stirred in and the reaction completed, a crystalline product is obtained, following the procedure detailed under Example I. Analysis of the crystalline end product shows the yield to be 789 grams of 1,4-dinitro-2,3,5-trimethyl-6-ethyl benzene, or a yield of 89.7%.

Examples IV to XI

The process of this invention has been demonstrated to produce other 1,4-dinitro-2,3,5,6-tetra alkyl benzenes by starting with a corresponding 2,3,5,6-tetra alkyl benzene. Thus, applicant has demonstrated that:

*Example IV.*—By starting with 2,3,5-trimethyl-6-n-propyl benzene, and nitrating in accord with the process of Examples I, II and III above, 1,4-dinitro-2,3,5-trimethyl-6-n-propyl benzene is produced.

*Example V.*—By starting with 2,3,5-trimethyl-6-n-butyl benzene, and nitrating in accord with the process of Examples I, II and III above, 1,4-dinitro-2,3,5-trimethyl-6-n-butyl benzene is produced.

*Example VI.*—By starting with 2,3,5-trimethyl-6-n-dodecyl benzene, and nitrating in accord with the process of Examples I, II and III above, 1,4-dinitro-2,3,5-trimethyl-6-n-dodecyl benzene is produced.

*Example VII.*—By starting with 2,3,5,6-tetra ethyl benzene, and nitrating in accord with the process of Examples I, II and III above, 1,4-dinitro-2,3,5,6-tetraethyl benzene is produced.

*Example VIII.*—By starting with 2,5-methyl-3-6-ethyl benzene, and nitrating in accord with the process of Examples I, II and III above, 1,4-dinitro-2,5-dimethyl-3-6-diethyl benzene is produced.

*Example IX.*—By starting with 2,3,5,6-tetra-n-propyl benzene, and nitrating in accord with the process of Examples I, II and III above, 1,4-dinitro-2,3,5,6-tetra-n-propyl benzene is produced.

*Example X.*—By starting with 2,3,5,6-tetra-n-butyl benzene, and nitrating in accord with the process of Examples I, II and III above, 1,4-dinitro-2,3,5,6-tetra-n-butyl benzene is produced.

*Example XI.*—By starting with 2,3,5-triethyl-6-iso-hexyl benzene, and nitrating in accord with the process of Examples I, II and III above, 1,4-dinitro-2,3,5-triethyl-6-iso-hexyl benzene is produced.

From his extensive experimentation and demonstration of the wide applicability of the process of this invention to produce other 1,4-dinitro-2,3,5,6-tetra alkyl benzenes, wherein the alkyl radical is an initially straight chained alkyl radical, than those hereinabove enumerated in Examples I to XI, applicant believes he has demonstrated that the process of this invention will produce the 1,4-dinitro-2,3,5,6-tetra initially straight chained alkyl benzenes generally.

While applicant has disclosed a number of specific embodiments of this invention and has illustrated the invention by the recitation of the production of numerous 1,4-dinitro-2,3,5,6-tetra alkyl benzenes, it is to be understood that the invention of this application is not intended to be limited to the specific embodiments herein disclosed or to the specific means for carrying out the process of this invention, but rather is it the intention of applicant that the claims of the patent to issue on this application cover all features of patentable novelty residing in the invention of this application within the scope and spirit of the appended claims:

What is claimed is:

1. The method of producing a 1,4-dinitro-2,3,5,6-tetra alkyl benzene comprising initially cooling a body of strong nitric acid having a specific gravity of from about 1.41 to about 1.51 to a substantially uniform temperature throughout by vigorously agitating said body of nitric acid in contact with cooling elements until said temperature is lowered to from about 5° to about 15° C., then adding gradually, little by little, to the cooled body of nitric acid while continuing the stirring and the cooling a powdered reactant consisting essentially of 2,3,5,6-tetra alkyl benzene, wherein each alkyl group contains from 1 to 6 carbon atoms, controlling the rate of said addition of the powdered reactant to, and the rate of cooling of, the resulting nitric acid mixture so as to maintain the said mixture at a substantially uniform temperature sufficiently low to prevent oxidizing fumes from being formed in the said mixture, continuing the said addition and cooling until the reaction approaches completion, thereafter admixing with stirring the resulting mixture with cold water to precipitate out 1,4-dinitro-2,3,5,6-tetra alkyl benzene, and filtering, washing, neutralizing and drying the crystalline solids to secure 1,4-dinitro-2,3,5,6-tetra alkyl benzene of high quality and of high yield.

2. The method defined in claim 1 wherein the temperature maintained in said nitric acid mixture during the reaction does not exceed about 25° C.

3. The method defined in claim 1 wherein the 2,3,5,6-tetra alkyl benzene is 2,3,5-trimethyl-6-ethyl benzene and the end product is a 1,4-dinitro-2,3,5-trimethyl-6-ethyl benzene.

4. The method defined in claim 1 wherein the 2,3,5,6-tetra alkyl benzene is 2,3,5-trimethyl-6-iso-hexyl benzene and the end product is 1,4-dinitro-2,3,5-trimethyl-6-isohexyl benzene.

References Cited in the file of this patent

UNITED STATES PATENTS

| | | |
|---|---|---|
| 967,337 | Day | Aug. 16, 1910 |
| 2,135,013 | Meissner | Nov. 1, 1938 |